UNITED STATES PATENT OFFICE.

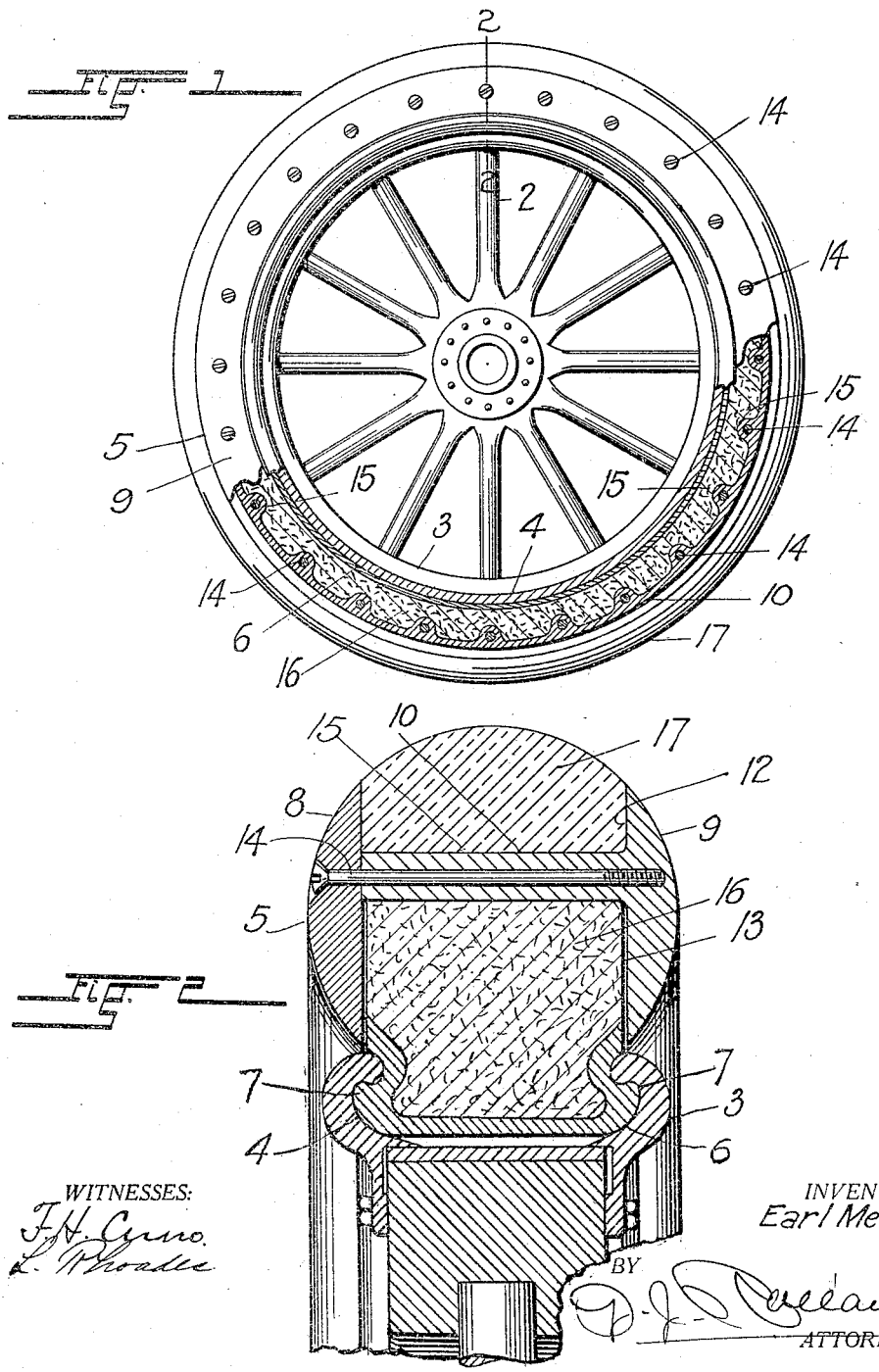

EARL MEFFERD, OF DENVER, COLORADO, ASSIGNOR OF ONE-FIFTH TO RAYMOND W. CAIN, OF DENVER, COLORADO.

CUSHION-TIRE.

1,212,084.     Specification of Letters Patent.     Patented Jan. 9, 1917.

Application filed May 12, 1915. Serial No. 27,542.

*To all whom it may concern:*

Be it known that I, EARL MEFFERD, a citizen of the United States, residing at Denver, in the county of Denver and State of Colorado, have invented certain new and useful Improvements in Cushion-Tires, of which the following is a specification.

This invention relates to cushion tires for vehicle wheels, and its primary object resides in providing a solid tire in which all the desirable characteristics of a pneumatic tire are combined with simplicity and economy of construction and superior practicability and durability in use.

In the accompanying drawings in the various views of which like parts are similarly designated, Figure 1 is a partially sectional side elevation of a wheel to which my improved tire is applied, and Fig. 2, an enlarged transverse section of the tire and the rim of the wheel upon which it is mounted, taken along the line 2—2, Fig. 1.

Referring more specifically to the drawings, the reference numeral 2 designates a wheel such as is commonly used on automobiles and other motor driven vehicles. The rim 3 of the wheel shown in the drawings is of the so-called separable rim type, but I desire it understood that my improved tire may be used with equal effect on wheels having rims of different construction such as those which for the ready application of tires, are provided with what is known in the art as a clencher rim.

My improved tire is composed of two component annular elements 4 and 5 one of which is radially movable with relation to the other. The element 4 consists of an exteriorly concave rim 6 provided with means such as the ribs 7 for its attachment to the rim of the wheel. The other element which in the use of the tire, moves with relation to the rim 6 to provide the resiliency required for reducing the effects of road shocks on the vehicle of which the wheel forms part, is composed of two parallel annular side members 8 and 9 connected by a circular band 10 which divides the space between the members into two chambers 12 and 13.

To facilitate the assembly of the different elements included in the construction of the tire, the element 5 is made in two parts secured together by screws. One of these parts includes the side member 9 and the circular band 10 in integral connection, while the other part consists of the other side member 8 which is secured in its proper position with relation to the member 9, by screws 14 which extend through alined holes in the two parts. The holes in the member 8 are countersunk at their outer ends to receive the heads of the screws, and those in the other part of the element are threaded and formed in the band 10 which to provide the stock required for this purpose, has at equidistant points of its periphery, transverse enlargements or ribs 15. The outer portion of the element 6 fits snugly between the side members 8 and 9 at the outer end of the chamber 13 of the other element, which has an elastic filling 16 preferably composed of cork. This filling serves in the use of the tire as a cushion which absorbs the shocks resulting from the contact of the tire with obstructions on the road along which the wheel of which it forms part, is propelled. The outer chamber 12 of the element 5 of the tire is occupied by a tread ring 17 the convex outer surface of which projects outside the same. The ring 17 is preferably made of a composition known in the trade as "disfico horn" which combines with a certain degree of resiliency, tenacity, hardness and other wear resisting qualities. The outer faces of the tread ring and the side members 8 and 9 of the element 5 are curved to conjointly present an unbroken contour which conforms with that of the pneumatic tires at present in common use.

In the use of my improved tire the elastic qualities of the tread ring and the cork filling interposed between the relatively movable elements, absorb the shocks and vibrations to which the wheel on which the tire is mounted is subjected by obstructions and hollows encountered on the road along which it is propelled. The tire is adapted for ready application to all wheels whose rims are designed for the attachment of pneumatic tires, the tread ring is by reason of the peculiar character of its composition, durable and wear-resisting to a high degree, and in case of accidental breakage it may be readily replaced by another similar ring without the necessity of detaching the tire from the wheel.

While I do not wish to be limited to the use of any specified material, I prefer to employ aluminum in producing the two principal elements of my improved tire, cork to form the cushion between these two elements, and a horn composition of the character mentioned to provide the tread ring which occupies the outer chamber of the movable element.

Having thus described my invention what I claim and desire to secure by Letters-Patent is:

A cushion tire comprising a channeled inner member fitting in the channeled rim of a motor-vehicle-wheel of ordinary construction, an outer member having exteriorly a thread and interiorly a channel in which said inner member is loosely fitted, and a body of elastic material filling the adjoining channels of said members.

In testimony whereof I have affixed my signature in presence of two witnesses.

EARL MEFFERD.

Witnesses:
G. J. ROLLANDET,
L. RHOADES.

Copies of this patent may be obtained for five cents each, by addressing the "Commissioner of Patents, Washington, D. C."